United States Patent

Vogel

[15] 3,670,694
[45] June 20, 1972

[54] APPARATUS FOR COATING FOOD ARTICLES

[72] Inventor: Leo G. Vogel, Downingtown, Pa.

[73] Assignee: Campbell Soup Company, Camden, N.J.

[22] Filed: Sept. 15, 1969

[21] Appl. No.: 857,675

[52] U.S. Cl. ................................118/24, 118/309, 118/312
[51] Int. Cl. ..........................................B05b 7/14, B05c 5/00
[58] Field of Search ..................118/308, 309, 312, 316, 326, 118/321, 24, 16, 13

[56] References Cited

UNITED STATES PATENTS

| | | | |
|---|---|---|---|
| 3,014,812 | 12/1961 | Sallie | 118/312 X |
| 3,299,853 | 1/1967 | Whitacre | 118/312 |
| 45,974 | 1/1965 | Chambers | 118/309 |
| 1,432,701 | 10/1922 | Lawrence | 118/24 |
| 2,924,911 | 2/1960 | Leliaert | 118/312 UX |
| 3,036,931 | 5/1962 | Kell | 118/321 X |
| 3,422,793 | 1/1969 | Lachmann | 118/326 X |

*Primary Examiner*—John P. McIntosh
*Attorney*—Howson & Howson

[57] ABSTRACT

An apparatus for applying moist, long strands of shredded coconut or similar material to a series of food articles, such as layer cakes, in which the coconut is sprayed onto and around the cakes by rotating impellers as the cakes advance through a chamber. The coconut not adhering to the cakes is collected at the bottom of the chamber by air under pressure and recirculated to the impellers by a conveyor system. A rotating agitator located within a reservoir continually breaks up lumps of the shredded coconut and laterally moving cups carry and crop the coconut to the impellers for application to the food articles.

5 Claims, 11 Drawing Figures

INVENTOR.
LEO G. VOGEL
BY
Harold L. O. Brian Jr.
ATTORNEY.

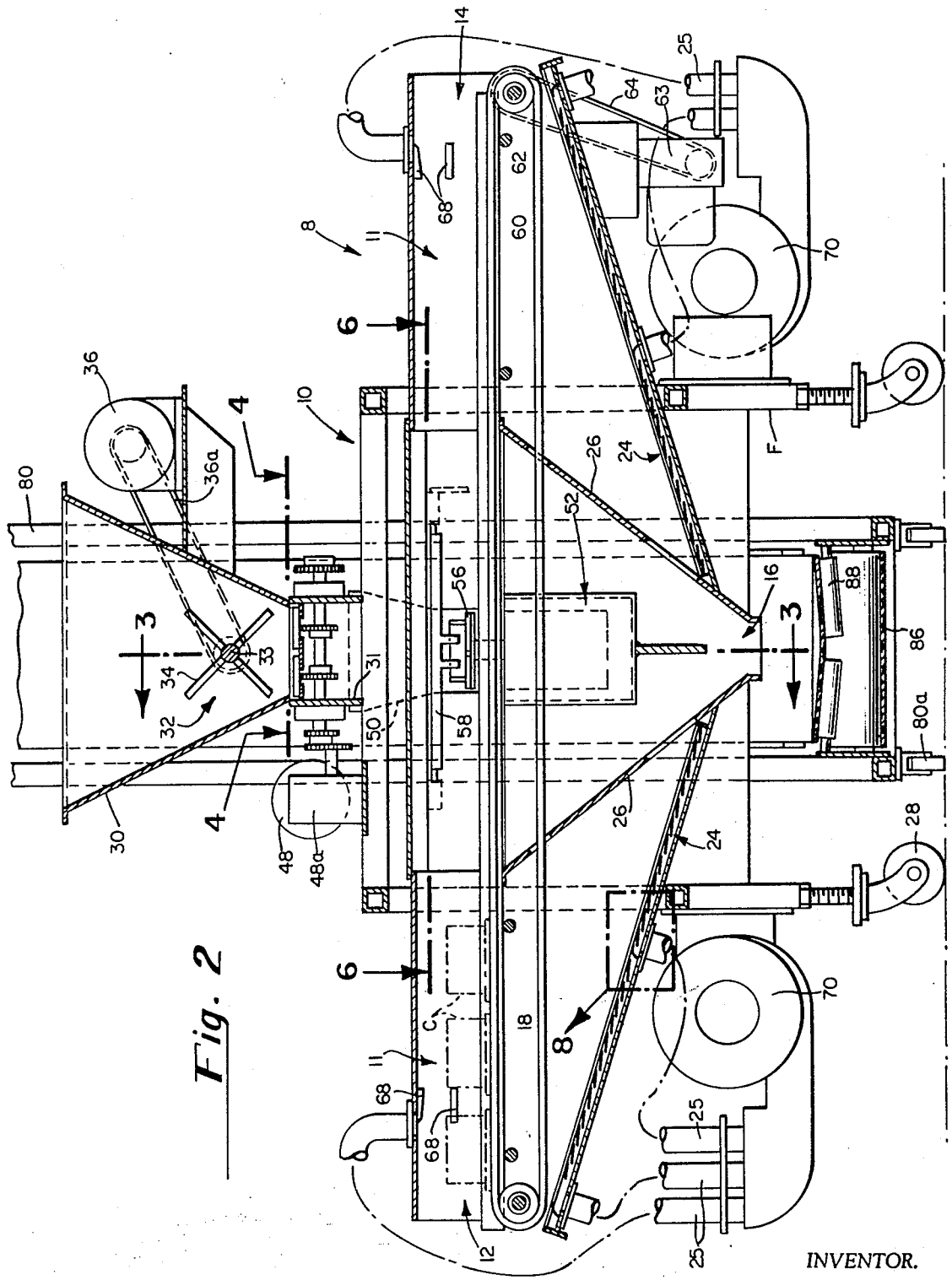

INVENTOR.
LEO G. VOGEL

BY

Harold O'Brien
ATTORNEY.

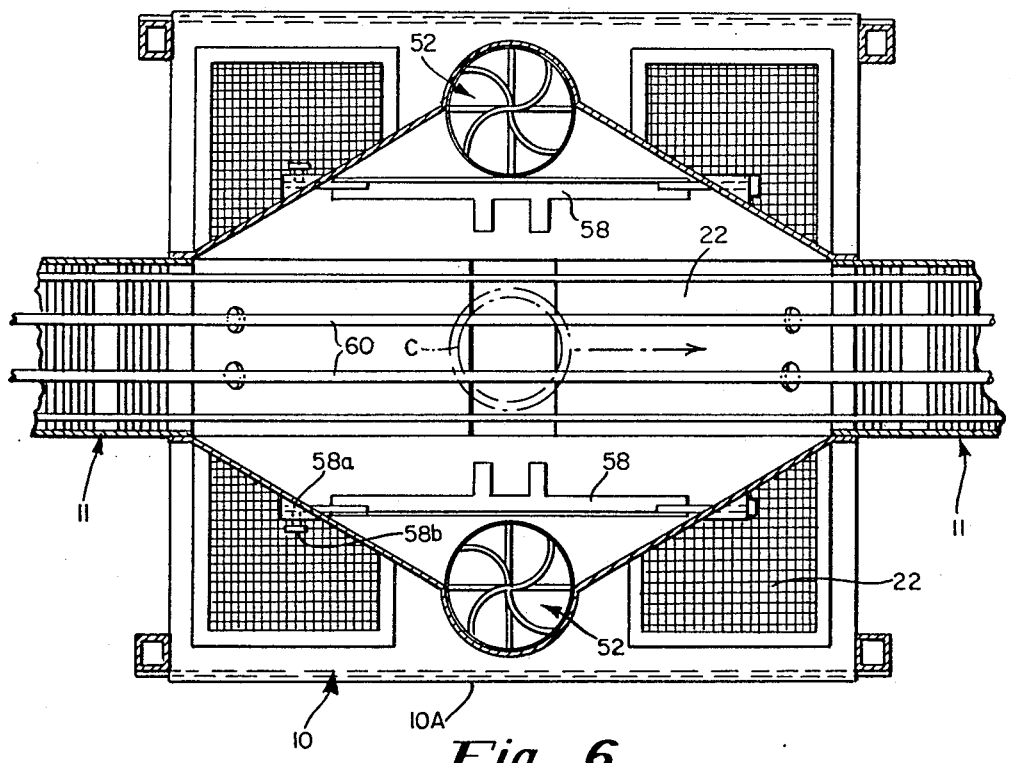
Fig. 6
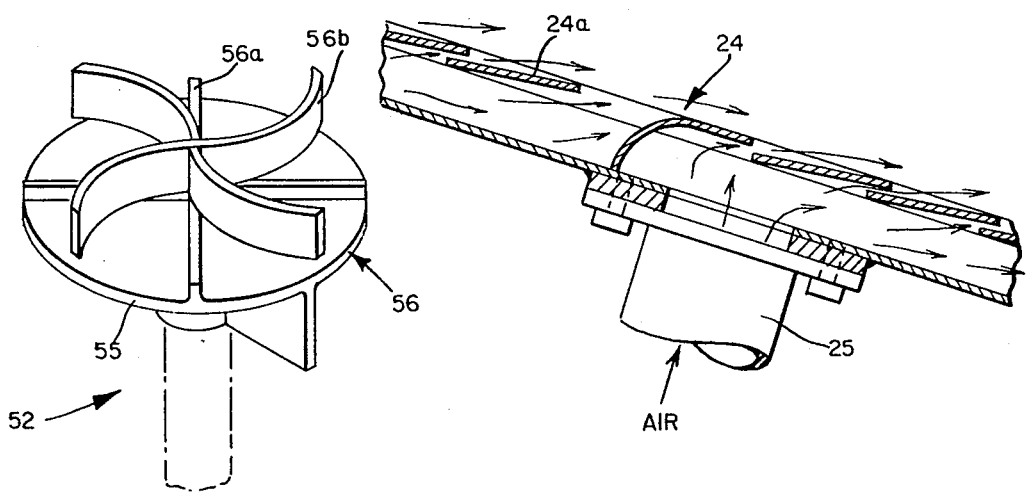
Fig. 7
Fig. 8
INVENTOR.
LEO G. VOGEL

APPARATUS FOR COATING FOOD ARTICLES

BACKGROUND OF THE INVENTION

In the manufacture of food articles, such as layer cakes, which have coconut particles adhering to a sticky icing, it has heretofore been possible to mechanically apply only a type of coconut which was in the form of frozen granules or flakes and not the more tasteful, moist, shredded coconut. The shredded coconut, which is familiar in the form of thin strands or shreds about 1 to 2 inches in length and one-thirtysecond of an inch in width, could not be mechanically applied to food articles because the coconut is very fragile and sticky and the applicating machines tended to crush the strips, forcing out the oil and causing the strips to turn black and adhere to parts of the applicator. The oily quality of the shredded coconut caused the strands to readily stick to one another and form hard balls or clumps, and to adhere and build up in portions of the machine thereby restricting and finally ending a flow of coconut to the fool articles which were to be coated. Specifically, it was found that the moist, shredded coconut could not be fed by a helical screw as shown in U.S. Pat. No. 3,351,038, nor could it be drawn through a conduit by air pressure as shown in U.S. Pat. No. 3,014,451 without clogging the conduit. Further, a vibratory feeder of U.S. Pat. No. 3,129,114 or the long applicating blades of U.S. Pat. No. 3,280,791 could not apply the long, moist strands of coconut. In short, it was found that the applicators available before this invention were adequate to handle and apply granular and dry coconut to food articles but could not be relied upon to feed and apply shredded coconut to a series of food articles at a controllable rate. For these reasons, shredded coconut has heretofore been applied by hand to several types of food articles resulting in greater expense and longer manufacturing procedures.

Therefore, it was the primary object of this invention to provide an apparatus for automatically applying moist, long strands of shredded coconut, or similar sticky moist material, to food articles. It was a further object of this invention to provide apparatus for controlling as desired the amount of coconut applied to the food articles.

SUMMARY OF THE INVENTION

In accordance with this invention, these and other objects have been satisfied by the provision of an apparatus which first accepts moist, shredded coconut in bulk or otherwise in a reservoir, breaks up the bulk into a fine mass of separate strands or shreds by means of a rotating agitator and then feeds the coconut at a controlled rate to a pair of rotating impellers which in turn spray it into a chamber and onto a line of progressing food articles. The coconut not adhering to the articles is collected from beneath the chamber and lifted by a conveyor to the reservoir on top of the chamber for recirculation and application to succeeding food articles.

The preferred form of the apparatus of this invention are described herein and shown in the attached drawings, wherein:

FIG. 2 is a longitudinal section, taken along the lines 2—2 of FIG. 1;

FIG. 6 is a transverse section taken along the lines 6—6 of FIGS. 2 and 3;

FIG. 7 is a perspective view of an impeller;

FIG. 8 is an enlarged view of the area designated 8 in FIG. 2;

DETAILED DESCRIPTION

Figure 1:
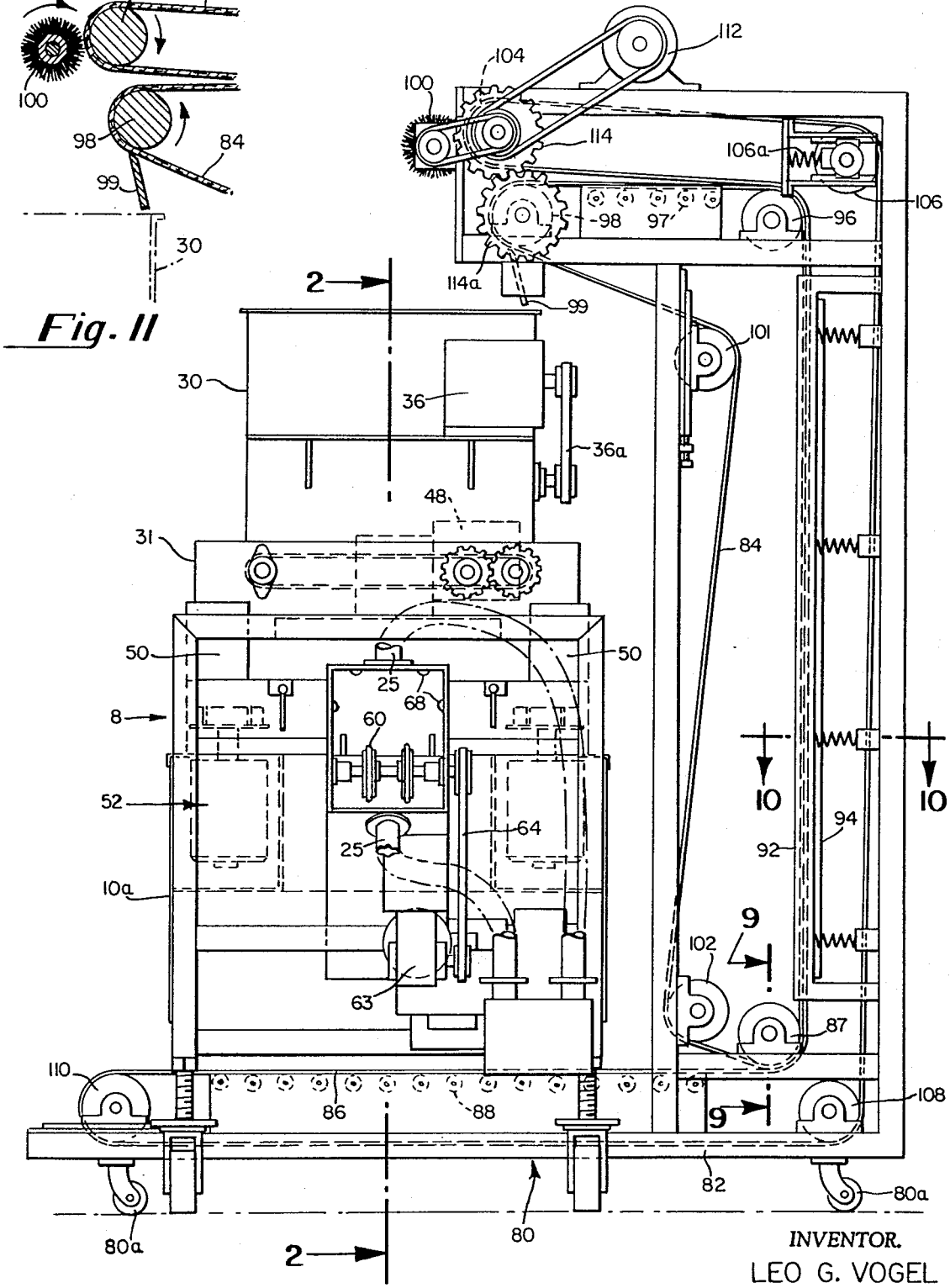
FIG. 1 is an end, elevational view, with certain structure indicated in broken lines of the preferred form of the applicator and conveyor apparatus of this invention.

In greater detail, the preferred form of the apparatus of this invention comprises an applicator 8 and conveyor 80 shown preliminarily in FIGS. 1 and 2, the applicator having a generally center cubical chamber 10 (FIG. 2) and two elongated portions 11 at opposing ends which in turn provide a food product inlet 12 and an outlet 14. A coconut discharge opening 16 is located in the bottom of the chamber 10. Chamber 10 is generally defined by flat, vertical side panels 10a, top screens 22 (FIG. 6) and lower, inclined partitions 26 which form a generally enclosed space in which shredded coconut is sprayed onto a line of cakes C (FIG. 2) moving through the chamber 10 and portions 11 on a conveyor belt 18. The applicator 8 and specifically chamber 10 are supported by a generally rectangular frame F mounted at four corners on rollers 28 to permit the applicator to be moved into a desired position adjacent conveyors and other manufacturing equipment. Extending outwardly from the bottom of chamber 10 are a pair of slatted air slides 24 which collect unused coconut for discharge from opening 16. Two impeller assemblies 52 are detachably mounted on frame F and within chamber 10.

Figure 3:
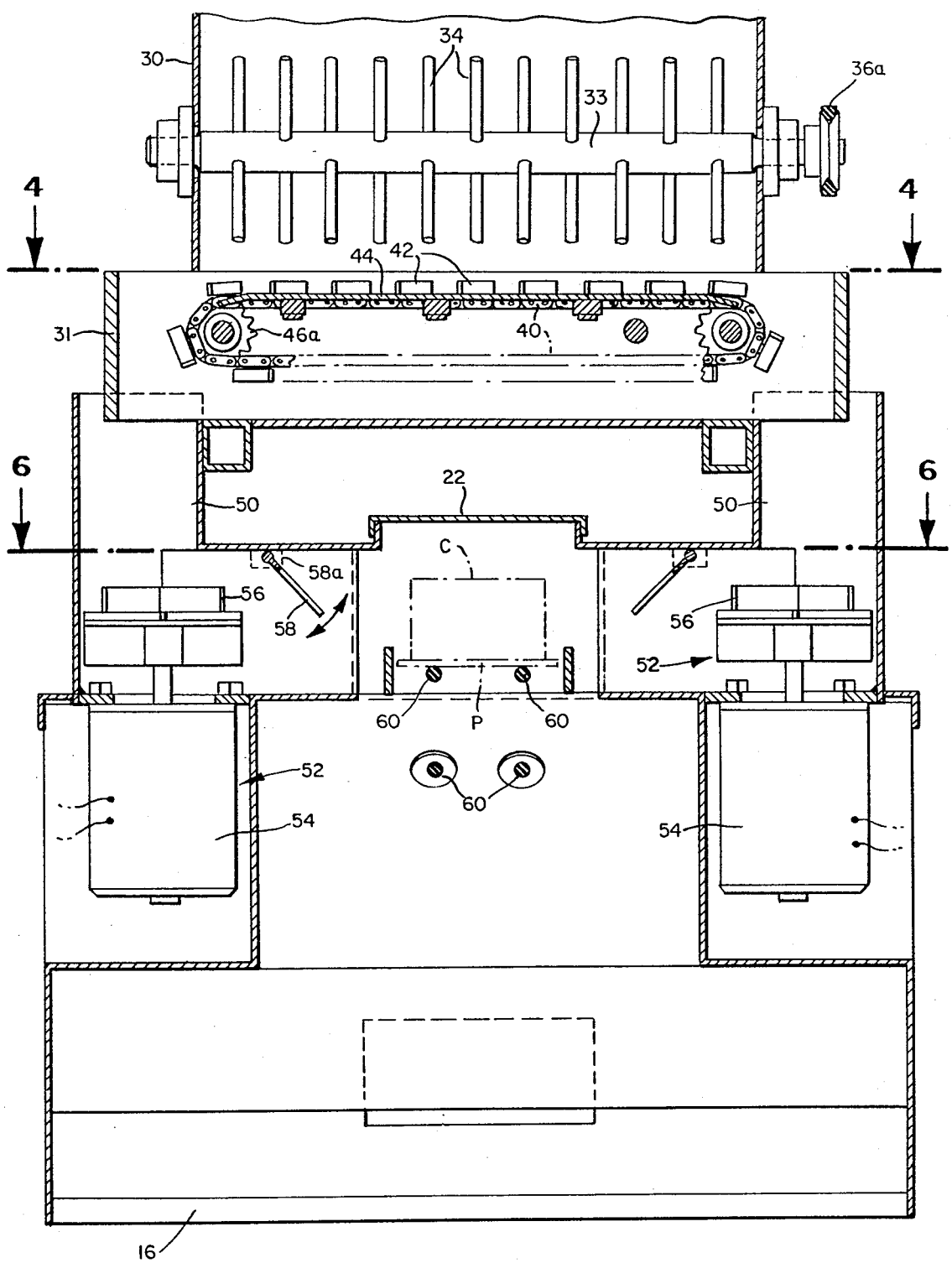
FIG. 3 is a transverse section taken along the lines 3—3 of FIG. 2.

A funnel-shaped, four-sided reservoir 30 is mounted above chamber 10 on a feed base 31 to receive shredded coconut in bulk form to start the process or in divided form as dropped from the conveyor apparatus 80 as shown best in FIGS. 1 and 2. An agitator 32 (FIGS. 2 and 3), comprising a horizontally mounted shaft 33 and a plurality of radially directed bars 34, is mounted for rotation near the bottom of reservoir 30 and driven by electric motor 36 and drive belt 36a.

Figure 4:
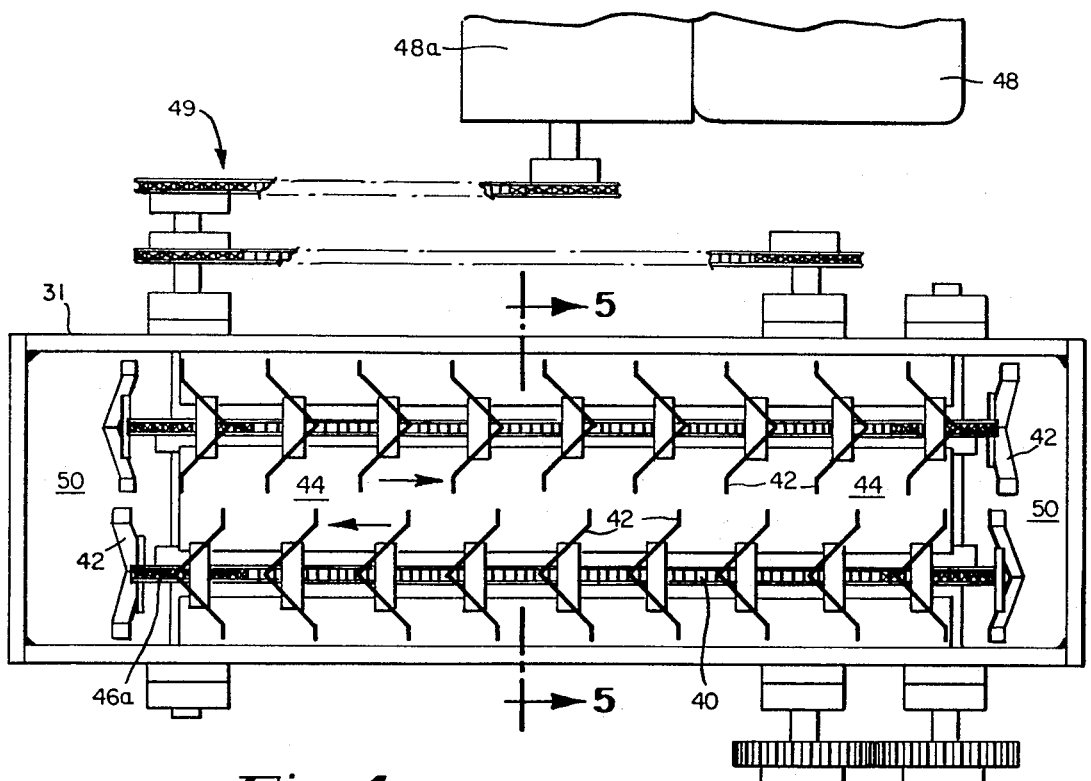
FIG. 4 is a transverse section taken along the lines 4—4 of FIGS. 2 and 3.
Figure 5:
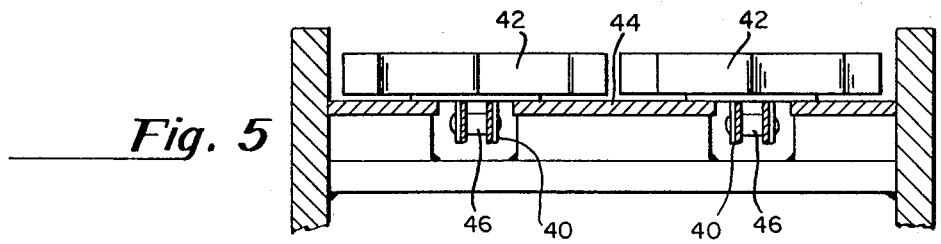
FIG. 5 is a fragmentary section taken along the lines 5—5 of FIG. 4.

A feed base 31, located beneath agitator 32 and at the base of reservoir 30, includes (FIGS. 4 and 5) a generally transverse, horizontal feed surface 44, a pair of endless feed chains 40, and a series of generally V-shaped cups 42 attached to the chains which move along the top of surface 44 (FIGS. 4 and 5). Each of the feed chains 40 is supported for movement by a plurality of rollers 46 and sheeves 46a and are driven in opposing directions by an electric motor 48 delivering power through connecting gear box 48a and a series of common drive belts and sheeves referred to generally by the numeral 49. Chains 40 are preferably driven at a speed of approximately 30 feet per minute and advance cups 42 to continually push and carry the shredded coconut in lateral directions, as indicated by the arrows in FIG. 4, away from the bottom of the hopper 30 toward the open tops of conduits 50.

A pair of impeller assemblies 52 (FIGS. 1, 2 and 3) are detachably mounted on opposing sides of the chamber 10 to receive through conduits 50 the coconut dropped by cups 42. Assemblies 52 are frequently removed from chamber 10 for cleaning and allow ready access to the interior of the chamber. The impeller assembly 52 (FIGS. 3, 6 and 7) comprises an electric motor 54 connected to generally horizontal plate 55 on which are mounted vanes 56. Vanes 56 (FIG. 7) preferably include four straight vanes 56a which fling the shredded coconut generally horizontally toward the center of the chamber and four curved vanes 56b which fling the coconut slightly upwardly so that the sprayed coconut deflects from the walls of the chamber and strikes all sides of the cakes except the base passing through the chamber. The vanes or impellers are preferably rotated at a high rate of speed, approximately 1,200 rpm, which prevents coconut from adhering to the vanes.

A pair of deflecting blades 58 (FIG. 3), preferably having an irregular shape as shown in FIG. 6, are mounted for pivotal movement in sleeves 58a in chamber 10 and are equipped with threaded, locking stops 58b which allow the blades to be held in a selected attitude. Blades 58 are located between impellers 52 and the cakes C (FIG. 3) to partially interrupt and direct the flow of coconut away from the cakes C and thereby control the quantity of coconut applied to the cakes. As the blades 58 are lowered toward the vertical position (FIG. 3), they deflect an increasing proportion of coconut sprayed from the impellers and the deflected coconut drops downwardly to pass out of the chamber through bottom discharge opening 16.

A series of cakes C having sticky icing or other types of surface and placed on a cardboard plate P, are advanced through the chamber 10 and portions 11 by a conveyor 18 (FIGS. 1 and 2) which comprises a pair of endless, round, silicone covered rubber belts 60 passing around a pair of end sleeves 62 and driven by motor 63 and a belt 64.

Apparatus to collect and return excess coconut from internal portions of the chamber and from the cakes C has also been provided. As shown in FIGS. 2, 6 and 8, the two inclined, shingle air slides 24 consist of a series of separate, overlapping transverse slides 24a which are spaced apart and overlapped to allow air under pressure to pass from beneath the slides and then over the top surfaces of each slide to thereby push coconut downwardly from one slide to another until the coconut falls out of discharge opening 16. Air is supplied through conduits 25. In this way, coconut which escapes out of chamber 10 and into end portions 11 is collected for reuse. In addition, a series of air jets 68 are located adjacent to and around the inlet and outlet 12, 14, to direct a continuous flow of air into the chamber and thereby remove coconut shreds from the belt 60 and from the cake plates P. A pair of rotary air compressors 70, shown in FIG. 2, supply air under pressure to the air conduits 68 which in turn feed the air to the shingled slides 24 and the jets 68 as shown.

Figure 11:
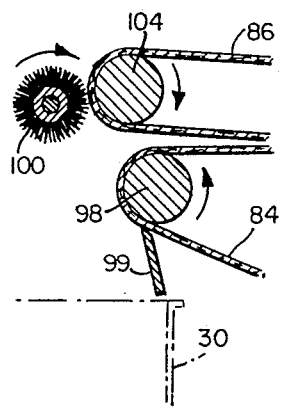
FIG. 11 is a diagrammatic view of the end portion of the conveyor apparatus shown in FIG. 1.
Figure 10:
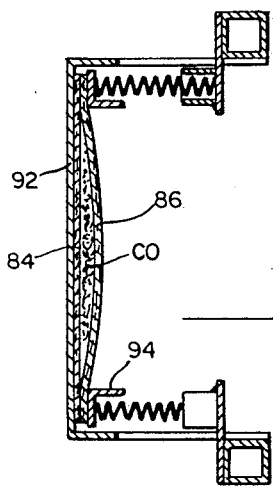
FIG. 10 is a transverse section taken along the lines 10—10 of FIG. 1.
Figure 9:
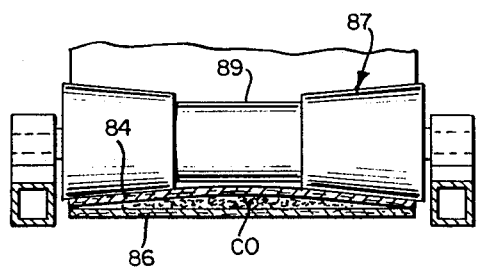
FIG. 9 is a transverse section taken along the lines 9—9 of FIG. 1.

A conveyor assembly 80 (FIG. 1) is independently mounted on four wheels 80a so that it can be easily moved and positioned to best advantage relative the applicator 8 as the working conditions allow. A basic frame 82 supports a pair of endless conveyor belts 84, 86 which generally function to pick up coconut discharged through opening 16 of the applicator, lift, and then drop the coconut into the top of reservoir 30 for recirculation. The belts 84, 86 are formed of an elastic material, such as Neoprene, which does not adversely affect the shredded coconut. Outer belt 86, along its lower horizontal portion, is supported by a series of inclined, cylindrical rollers 88 (FIG. 2) to form a trough in the center of the belt in which the coconut is initially held. In the direction of movement, belt 86 then contacts inner belt 84 and together both belts pass around beveled roller 87 (FIG. 9) which has an indented center 89 to avoid compressing the coconut between the belts as they pass around the roller. A vertical back-up plate 92 (FIGS. 1 and 10) is located adjacent the back surface of belt 84 during the vertical rise portions of both belts and a pair of spring-biased, L-shaped side bars 94 hold the sides of the two belts together thereby preventing coconut CO from escaping from between the belts. The belts then pass over top roller 96, similar in construction to roller 87, and the top horizontal portion of belt 84, which then becomes the coconut supporting belt, is carried by a series of inclined, cylindrical rollers 97 which again form a trough in the belt. The coconut is carried over the rim of the reservoir 30 until it drops as belt 84 passes around roller 98. A scraper 99, shown enlarged in FIG. 11, scrapes any adhering coconut from belt 84 and a rotating brush 100 similarly brushes adhering coconut from belt 86. Belt 84 then passes around rollers 101, 102 to complete the circuit. Belt 86 separates from belt 84 after both belts have passed around roller 96 and it, in turn, passes consecutively around rollers 104, 106, 108 and 110 to complete its circuit. Roller 106 is equipped with a tensioning spring 106a to maintain the desired tension on belt 86. An electric motor 112 drives the belts through a pair of drive gears 114, 114a at a preferred speed of about 60 feet per minute.

The preferred apparatus of this invention as described herein operates substantially as follows. A series of articles to be coated, such as cakes C with icing applied, of a size of about 6 by 6 by 3 inches and each being mounted on a tray, are placed manually or by machine on conveyor belt 18 at the inlet 12 of applicator 8. At the same time, shredded coconut in loose or block form is dropped into reservoir 30. Coconut may also be fed to the applicator through one of the top screens 22 (FIG. 6) to slide down surfaces 26 and be picked up by the conveyor apparatus 80 and thereafter carried to reservoir 30. As the blocks or lumps of coconut strike the rotating agitator 32, they are broken up and the coconut begins to accumulate as loose and separate strands in the base of the reservoir 30 and along the top of the flat feed surface 44. Moving feed chains 40 and cups 42 continually draw portions of this head of coconut away from the bottom of the reservoir and carry it outwardly so that it falls through the conduits 50 onto the rapidly spinning vanes of the impellers 56. The coconut is then sprayed radially into the center portion of the chamber 10 and strikes and adheres to the sticky surface of the cakes C advancing on the conveyor 18. The quantity of coconut applied to each cake is controlled by the setting of blades 58. Coconut not adhering to the cakes moving through the chamber is deflected from the interior walls of the chamber and slides downwardly along panels 26 to opening 16. The coconut which flies toward the inlet and outlet of the chamber drops between the belts 60 onto the shingled slides 24 and is returned to opening 16 by the air currents generated by rotary pump 70. Similarly, excess coconut deposited on the cake plate P, the belts 60 and the cake itself are blown back into the chamber and onto the slides 24 by a series of air jets 68. A continuous stream of coconut discharged through opening 16 is picked up on conveyor belt 86 and in conjunction with belt 84 is raised to a location above the reservoir 30 and then dumped back into reservoir 30.

The construction of the belts and the relatively small forces employed in pressing the belts together avoids compacting the coconut into hard balls or extracting its oil. Similarly, use of stainless steel to form the chamber prevents the coconut from being discolored. The shingled air slides allow the coconut to be easily quickly gathered without injury to the coconut. The applicator as described can completely coat cakes at a rate of 85 cakes per minute while avoiding degradation and loss of the coconut by improper handling.

Although the apparatus and process of this invention have been shown and described with reference to particular structure, it should be understood that modifications in the forms shown may be made by persons skilled in the art without departing from the spirit of the invention. For example, the apparatus and process may coat products other than cakes with a material different than shredded coconut. It is noted that the velocities of several components stated herein are for example only and that in all cases acceptable results will be derived from operation of the apparatus within a range of velocities.

I claim:

1. Apparatus for applying a generally adhesive shredded material such as coconut uniformly to the surface of each of a series of consecutively moving articles such as cakes comprising: a substantially closed chamber adapted to receive the articles therein for coating, a pair of rotating impellers mounted within the chamber and on opposite sides of the path of movement of the articles to be coated to spray the shredded material about the chamber and onto the surface of the articles within the chamber, a reservoir located above the chamber to receive and contain a supply of the shredded material, agitating means within said reservoir to continuously agitate the shredded material to break up and separate the shredded material into shreds, material supply means mounted at the base of said reservoir and having elements movable in opposite directions through the reservoir, means to move said elements, said supply means being operable to move material at the base of said reservoir transversely of the reservoir and in opposite directions with respect to said reservoir to drop the material at a substantially uniform rate onto said rotating impellers, and conveying means for collecting the shredded material not adhering to the articles in the chamber from the bottom of the chamber and returning the same to the reservoir for reuse.

2. Apparatus in accordance with claim 1 including article conveying means to move the articles to be coated along a straight path through the center of said chamber, and said impellers being mounted for rotation about vertical axes.

3. Apparatus in accordance with claim 1 in which the material supply means at the base of said reservoir comprises at least one feed chain moving parallel to the base of said reservoir, and said elements include a plurality of cups attached to the chain to move along the base of the reservoir and thereby pull shredded material from the base of the reservoir and drop the same onto the impellers.

4. Apparatus in accordance with claim 1 including a pair of adjustable deflecting blades positioned within said chamber intermediate said impellers and the article to be coated for controllably deflecting at least a portion of the material sprayed within said chamber by said impellers away from the article to be coated and thereby control the quantity of said material applied to each article.

5. Apparatus in accordance with claim 1 in which the means to receive material from beneath said chamber and return the same to said reservoir includes a pair of conveyor belts pressed together along a portion of their lengths to retain and convey shredded material therebetween and separated along another portion of their length to receive shredded material from beneath the chamber.

* * * * *